US011554803B2

(12) United States Patent
Gosztyla et al.

(10) Patent No.: US 11,554,803 B2
(45) Date of Patent: Jan. 17, 2023

(54) ABSOLUTE POSITION NON-CONTACT RAKE SENSOR FOR A STEERING COLUMN

(71) Applicant: STEERING SOLUTIONS IP HOLDING CORPORATION, Saginaw, MI (US)

(72) Inventors: Damian Z. Gosztyla, Bay City, MI (US); Robert D. Bueche, Montrose, MI (US); James E. Rouleau, Burt, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 341 days.

(21) Appl. No.: 16/852,001

(22) Filed: Apr. 17, 2020

(65) Prior Publication Data

US 2021/0323596 A1 Oct. 21, 2021

(51) Int. Cl.

| | |
|---|---|
| ***B62D 1/04*** | (2006.01) |
| ***B62D 1/16*** | (2006.01) |
| ***B62D 15/02*** | (2006.01) |
| ***G01D 5/14*** | (2006.01) |
| ***G01B 7/00*** | (2006.01) |

(52) U.S. Cl.

CPC ................ *B62D 1/16* (2013.01); *B62D 1/04* (2013.01); *B62D 15/0215* (2013.01); *G01D 5/145* (2013.01)

(58) Field of Classification Search

CPC ... B62D 1/04; B62D 1/16; B62D 1/18; B62D 1/181; B62D 15/0215; G01D 5/142; G01D 5/145; G01D 5/147; G01D 2205/20; G01D 2205/28; G01B 7/003; G01B 7/30; G01B 7/31; G01C 9/06

See application file for complete search history.

(56) References Cited

U.S. PATENT DOCUMENTS 9,682,724 B2 * 6/2017 Schnieders ............... F16H 1/02
2006/0230863 A1 * 10/2006 Rouleau ................ B62D 1/184 74/492
2009/0322320 A1 * 12/2009 Hatanaka ........... B62D 15/0215 324/207.25
2012/0119731 A1 * 5/2012 Deitmerg ................ G01B 7/30 324/207.25

(Continued)

FOREIGN PATENT DOCUMENTS

FR 2906363 A1 * 3/2008 ......... B62D 15/0215

*Primary Examiner* — James A English
*Assistant Examiner* — Daniel M. Keck
(74) *Attorney, Agent, or Firm* — Dickinson Wright PLLC

(57) ABSTRACT

Embodiments described herein are for an absolute position sensor system integrated into a steering column assembly. The absolute position sensor system comprises: a sector connected to a rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device is configured to: detect an angle of rotation of the magnet, where the angle of rotation of the magnet corresponds to a position of the rake adjustment mechanism.

20 Claims, 5 Drawing Sheets

220 204 214 702 402

(56) References Cited

U.S. PATENT DOCUMENTS

2016/0144883 A1* 5/2016 Vermeersch ........... B62D 1/184
74/495
2018/0292237 A1* 10/2018 Bilbao De Mendizabal ..............
B62D 15/0215

* cited by examiner

ABSOLUTE POSITION NON-CONTACT RAKE SENSOR FOR A STEERING COLUMN

TECHNICAL FIELD

This disclosure relates to vehicles and in particular to systems for monitoring positioning of power adjustable columns.

BACKGROUND

Conventionally power column memory controllers use a relative position system to track the positions of the steering column axis. This type of system requires that the memory controller accumulates information and computes the current position based on previous positions of the steering column. Errors that occur in this type of system involve issues in accumulating change in position of the steering column and detecting incorrect previous positions of the steering column.

Issues in accumulating change in position occur when the controller does not recognize motion has occurred and the motion information thereby is not captured. This may be a result of a faulty monitoring algorithm. For example, a controller monitoring an actuator that enables the movement of a steering column may stop monitoring the actuator before movement of the steering column is complete or poor signal quality may cause integral information related to the movement of the steering column not to be recognized. More specifically, over accumulation may occur if noise on the signal is misinterpreted as relevant information. Errors associated with the accumulation of information can be compounding and even small errors can add up to become significant errors with time. These errors will eventually cause issues in detecting the correct positioning of the steering column.

The detection of an incorrect starting location is usually associated with a loss of information. The current position of the actuator can be lost if not saved to non-volatile memory within a certain period. In some instances, the current position of the actuator may not be saved before a steering column system is reset. As such, the current position recalled after the system is reset will not be the actual current position of the steering column, but the previously saved position information.

SUMMARY

This disclosure relates generally to systems for detecting a position of a steering column of a steering column assembly of a vehicle. An aspect of the disclosed embodiments includes an absolute position sensor system integrated into a steering column assembly of a vehicle. The absolute position sensor system includes: a sector connected to a rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device configured to: detect an angle of rotation of the magnet, the angle of rotation of the magnet corresponding to a position of the rake adjustment mechanism; and generate, for a controller configured to monitor positioning of a steering column of the steering column assembly, a signal that indicates the position of the steering column.

Another aspect of the disclosed embodiments includes a steering column assembly of a vehicle. The steering column assembly of a vehicle, comprises: a steering column; a mounting bracket operable to attach the steering column assembly to the vehicle; a rake adjustment mechanism operable to move in an arcuate motion to adjust the steering column in a rake direction; and an absolute position sensor system. The absolute position sensor system comprises: a sector connected to the rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device is configured to: detect an angle of rotation of the magnet, the angle of rotation of the magnet corresponding to a position of the rake adjustment mechanism; and generate a signal that indicates the position of the steering column.

Another aspect of the disclosed embodiments includes a steering column assembly of a vehicle. The steering column assembly comprises: a steering column; a mounting bracket operable to attach the steering column assembly to the vehicle; a rake adjustment mechanism operable to move in an arcuate motion to adjust the steering column in a rake direction; an absolute position sensor system; and a controller. The absolute position sensor system comprises: a sector connected to the rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device is configured to: detect an angle of rotation of the magnet, the angle of rotation of the magnet corresponding to a position of the rake adjustment mechanism; and generate a signal that indicates the position of the steering column. A controller configured to: receive the signal that indicates the position of the steering column; generate a steering column position control value based on the signal; and selectively control the position of a steering wheel of the vehicle based on the steering column position control value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Systems described herein may be configured to address the problems described above by generating, for a controller tasked to monitor the position of a steering column, a plurality of signals, where each signal of the plurality of signals corresponds to a unique position of the steering column. As such, in accordance with embodiments described herein, the controller will be able to receive and interpret a signal and without performing further calculations or accessing memory to determine positioning of the steering column. While conventional steering column assemblies may implement a relative position system that generate signals including incremental movement information of a steering column, the embodiments described herein implement an absolute position sensor system that is configured to generate signals that are indicative of particular positioning of the steering column.

For example, an aspect of the disclosed embodiments includes an absolute position sensor system integrated into a steering column assembly of a vehicle. The absolute position sensor system includes: a sector connected to a rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device configured to: detect an angle of rotation of the magnet, the angle of rotation of the magnet corresponding to a position of the rake adjustment mechanism; and generate, for a controller configured to monitor positioning of a steering column of the steering column assembly, a signal that indicates the position of the steering column.

Figure 1:
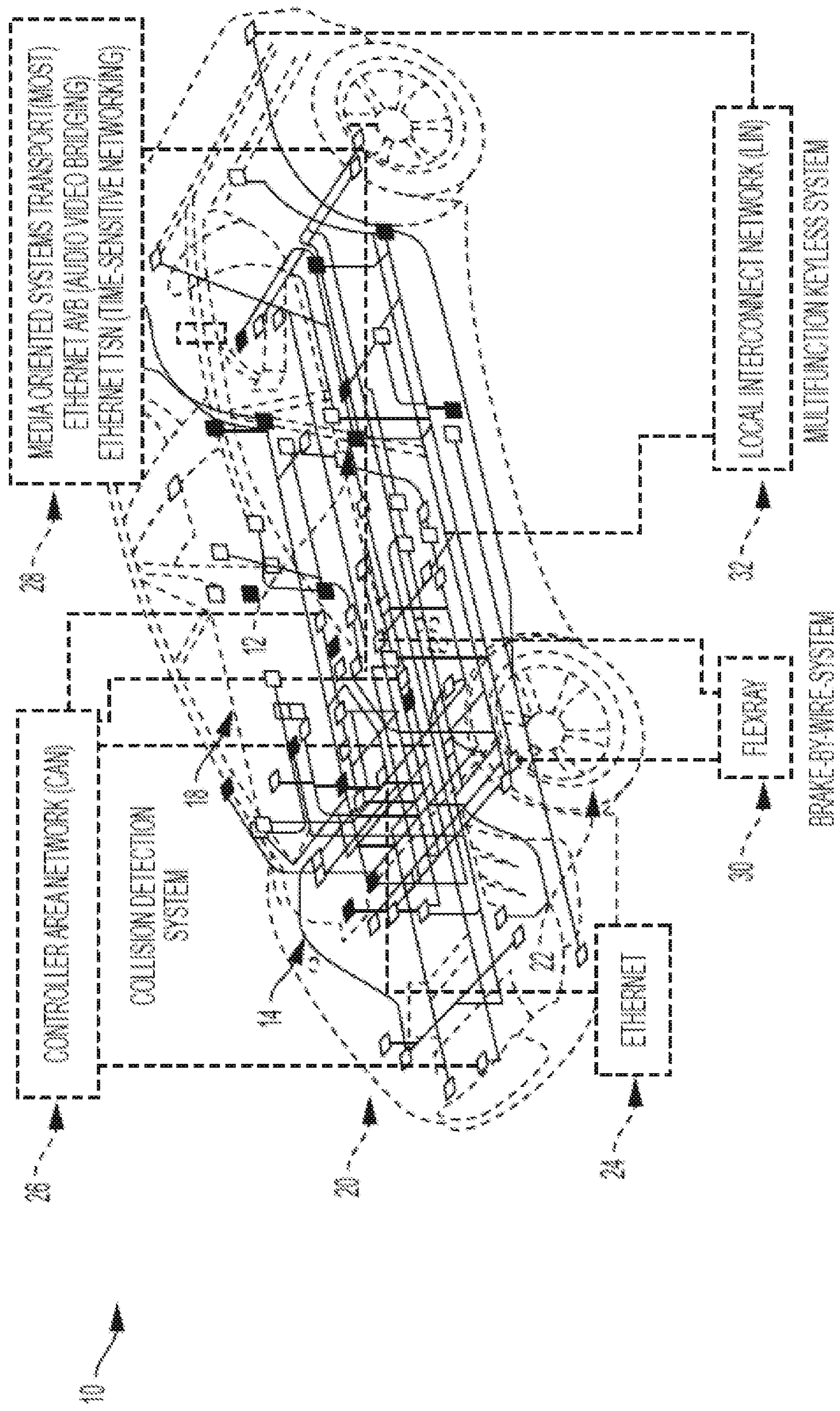
FIG. 1 generally illustrates a vehicle according to the principles of the present disclosure.

To explore the foregoing in further detail, FIG. 1 will now be described. FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. In some embodiments, the vehicle 10 is configured for domain control with over-the-air programming support. For example, as described, the vehicle 10 may receive updates for any suitable software component of the vehicle 10, via the Internet (e.g., or other suitable network). The vehicle 10 may update or change software components based on the update. The vehicle 10 may include additional or fewer features than those generally illustrated and/or disclosed herein.

Figure 2:
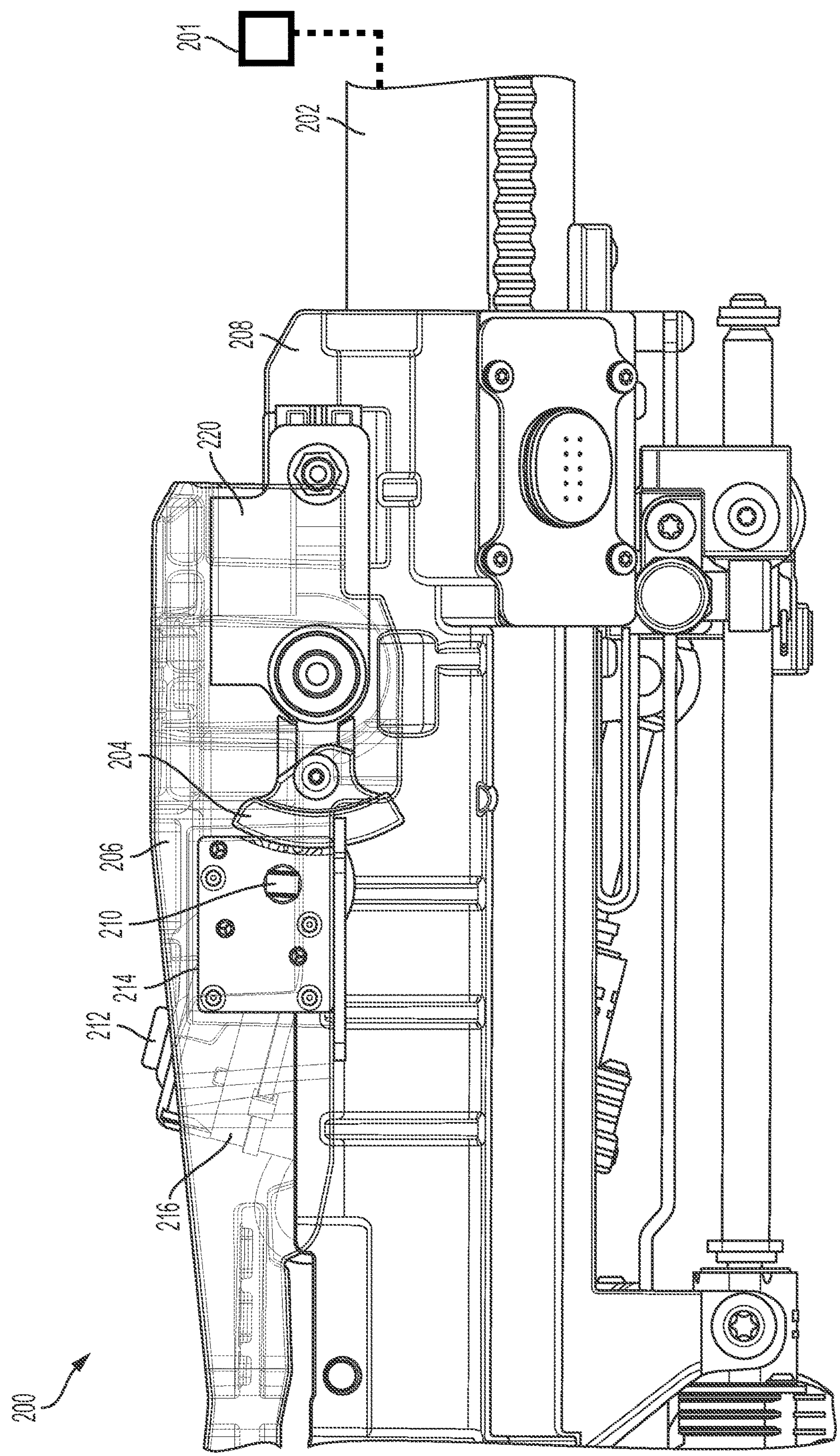
FIG. 2 generally illustrates a steering column assembly of a vehicle according to the principles of the present disclosure.

In some embodiments, the vehicle 10 may further include a steering column assembly. A steering column system 200 according to the principles of the present disclosure is generally shown in FIG. 2. Vehicle 10 may include the steering column system 200 and an operator of vehicle 10 may adjust a steering wheel 201 of the steering column assembly 200 for a rake (i.e., up and down) and for reach (i.e., telescoping movement in and out). The steering column system 200 includes an upper jacket 202 which carries an inner rotating shaft for transmitting movements from the steering wheel 201 to front wheels of vehicle 10. The inner rotating shaft may be coupled to an electronic control mechanism or assist. Alternatively, the inner rotating shaft can extend to a hydraulic or mechanical steering mechanism.

For purposes of supporting the steering column system 200 within the vehicle 10, the steering column system 200 includes a mounting bracket 206 configured to facilitate a fixed, or stationary, attachment of the steering column system 200 relative to the vehicle 10. The steering column system 200 further includes a lower jacket 208 that defines an internal cavity having an open end. As shown in FIG. 2, the internal cavity of the lower jacket 208 is sized to accommodate the upper jacket 202 and the upper jacket 202 is positioned within the internal cavity of the lower jacket 208 such that a portion of the upper jacket 202 is extending outside of the lower jacket 208. The lower jacket 208 is connected to and partially positioned within mounting bracket 206 in such a manner that the upper jacket 202 is permitted to travel in arcuate (rake) and axial (telescope) motions relative to the vehicle.

To achieve an arcuate motion, as shown in FIG. 2, the steering column system 200 includes a motor 216 and gearing (not shown) for transferring the rotary motion of the motor 216 to move a rake bracket 220. The rake bracket 220 is operable to move in a rake direction and may be one or more parts of a rake adjustment mechanism of the steering column system 200. The rake bracket 220 is connected to the lower jacket 208 and operable to move the lower jacket 208 and the upper jacket 202 in the rake direction. Further, the rake bracket 220 is connected to a sector 204 and operable to move the sector. The sector 204 is coupled to a gear and operable to rotate the gear. The gear (shown in FIGS. 4 and 5) is coupled to the sector 204 and operable to be rotated by the movement of the sector 204. A magnet (shown in FIG. 6) is connected to and retained by the gear such that the magnet rotates responsive to the rotation of the gear.

In FIG. 2, a sensor device 214 may be positioned below the magnet and connected to a stationary part of the steering column assembly. As further shown in FIG. 2, the sensor device 214 is mechanically coupled to the mounting bracket 206. In some embodiments, the sensor device 214 and the mounting bracket 206 may be affixed to each other using fasteners (e.g., bolts, screws, etc.) or via another attachment structure. The sensor device 214 is configured to detect an angle of rotation of the magnet, where the angle of rotation of the magnet corresponds to a position of the rake bracket 220, and send a signal that is indicative of the position of the rake bracket 220 to a controller 212. The sensor device 214 may include an absolute position sensor, such as a Hall-effect sensor 210. For example, in some embodiments, the sensor device 214 may include a programmable linear Hall-effect sensor integrated circuit (IC). Further, the sensor device 214 may include one or more Hall-effect sensing elements and signal processing circuitry.

The controller 212 may include any suitable controller, such as a vehicle electronic control unit, a processor, or any other suitable controller, such as those described herein. The controller 212 is configured to receive the signal sent by the sensor device 214, to interpret the signal, generate a steering column position control value based on the signal, and selectively control position of the steering wheel 201 of the vehicle based on the steering column position control value. For example, the controller 212 may be configured to monitor the position of a steering column assembly 200 to prevent movement of a steering wheel 201 of the steering column assembly 200 from violating any boundaries or creating any clearance concerns. In the event that the steering column assembly 200 is commanded to move into a position that would create a clearance concern, the controller 212 can force movement of the steering column assembly 200 with the steering column position control value to avoid the clearance concern.

Figure 3:
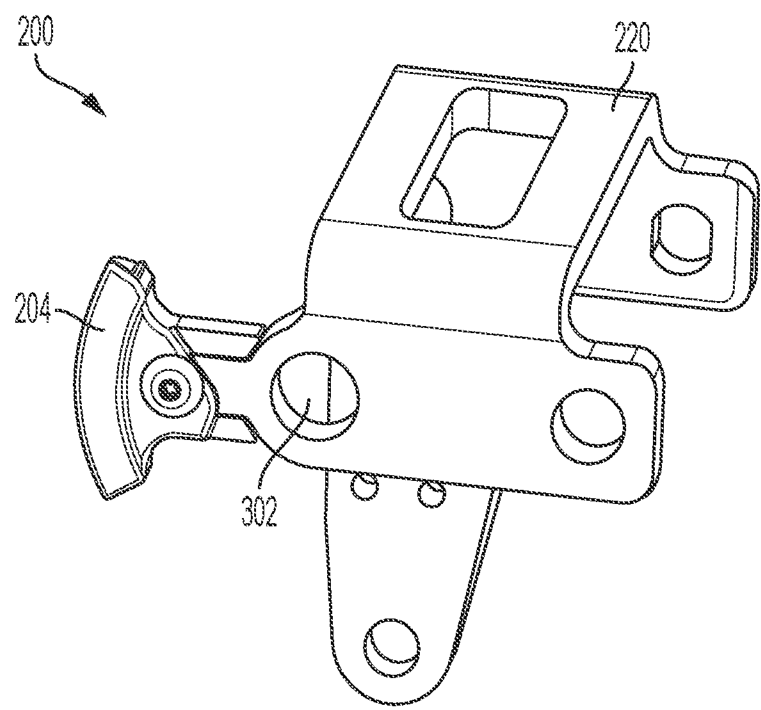
FIG. 3 generally illustrates an enlarged perspective view of a steering column assembly of a vehicle according to the principles of the present disclosure.

To explore this further detail, FIG. 3 will now be described. FIG. 3 provides an enlarged perspective view of components of the steering column assembly 200 in FIG. 2. As shown in FIG. 3, the sector 204 is connected to the rake bracket 220. The sector is operable to be rotated by the movement of the rake bracket 220. In some embodiments, the sector 204 may be an integral part or an attachment to the rake bracket 220. Raking of the steering column assembly 200 may cause the rake bracket 220 to rotate about an axis 302. The axis 302 may be a center of rotation for the sector 204.

Figure 4:
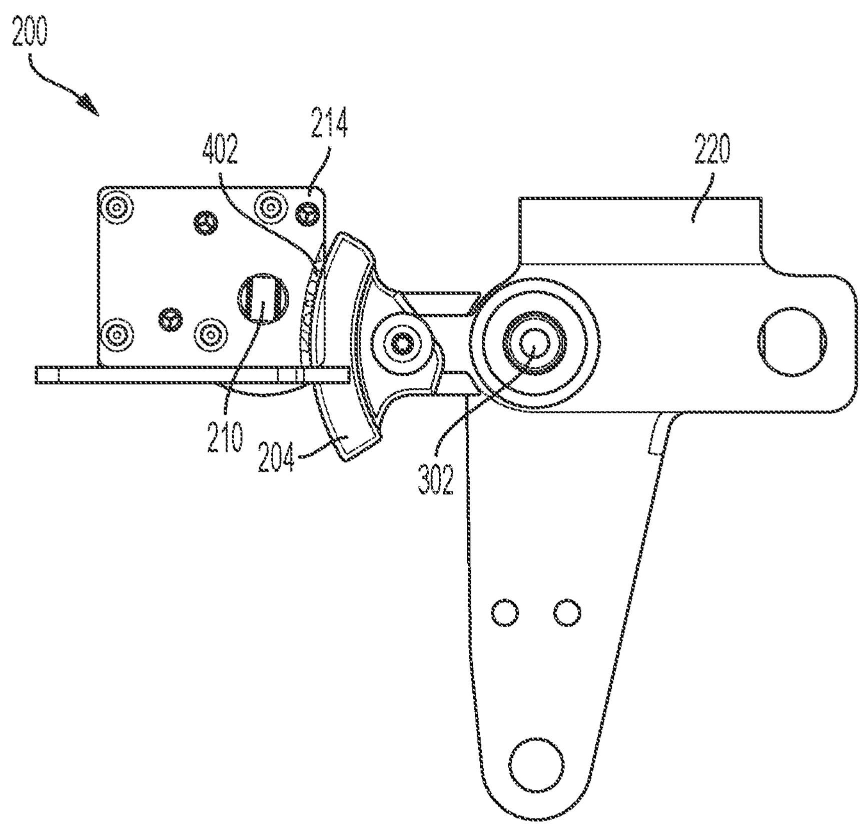
FIG. 4 generally illustrates an enlarged perspective view of a steering column assembly according to the principles of the present disclosure.

FIG. 4 provides another enlarged perspective view of components of the steering column assembly 200 in FIG. 2. In FIG. 4, an absolute position sensor system may include a gear 214 or a set of gears, a rotating magnet (shown in FIG. 6), and a sensor device 214. These components of the absolute sensor position system transform pivoting motion of the rake bracket 220 into a rotating magnetic field. For example, in FIG. 4, the rotating magnetic field is sensed by Hall-effect sensor 210 as an angle. Each angle of magnetic rotation may correspond with a unique rake position of the steering column of the steering column assembly 200. This allows the controller 212 in FIG. 2 of the steering column assembly 200 to accurately determine a column position without previous positioning information of a steering column of the steering column assembly 200.

Figure 5:
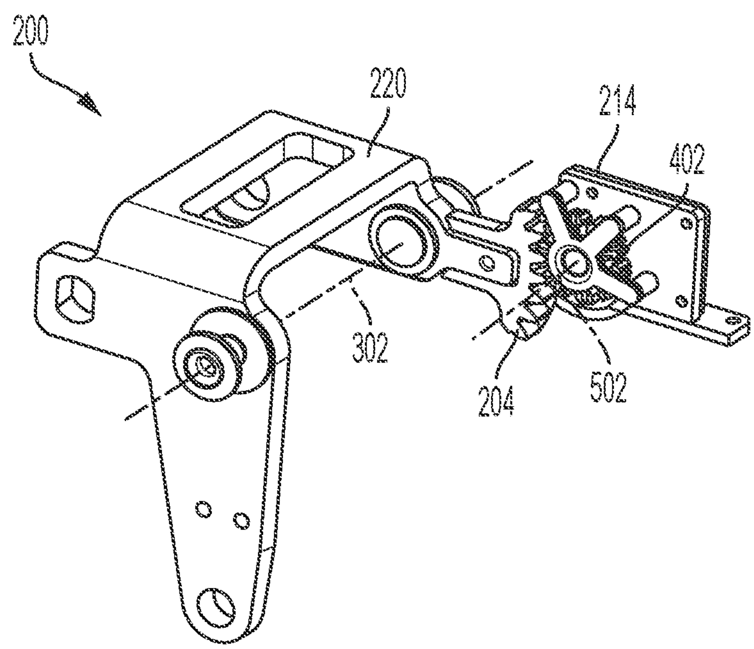
FIG. 5 generally illustrates an enlarged perspective view of a steering column assembly according to the principles of the present disclosure.

FIG. 5 provides another enlarged perspective view of components of the steering column assembly 200 in FIG. 2. As shown in FIG. 5, the sector 204 is coupled to the gear 214 through gear teeth. In some embodiments, motion of the sector 204 causes the gear 402 to rotate on a second axis, that is, an axis of a magnet 502. The gear 402 is also configured to hold or retain a magnet (also referred to as a “target”). To help further illustrate, the gear 402 may be positioned above the sensor device 214. Rotation of the gear 402 and the magnet (as a unit) may provide the rotation of the magnetic field.

In some embodiments, the gear 402 may exhibit bifurcated teeth. This tooth design provides a lash-free interface between the sector 204 and the gear 402. Other implementations of gears (e.g., a scissor gear) may be employed to accomplish this function. Although this implementation shows the delash function being accomplished by the gear 402, it is also feasible to accomplish the delash function with the sector 204.

Figure 6:
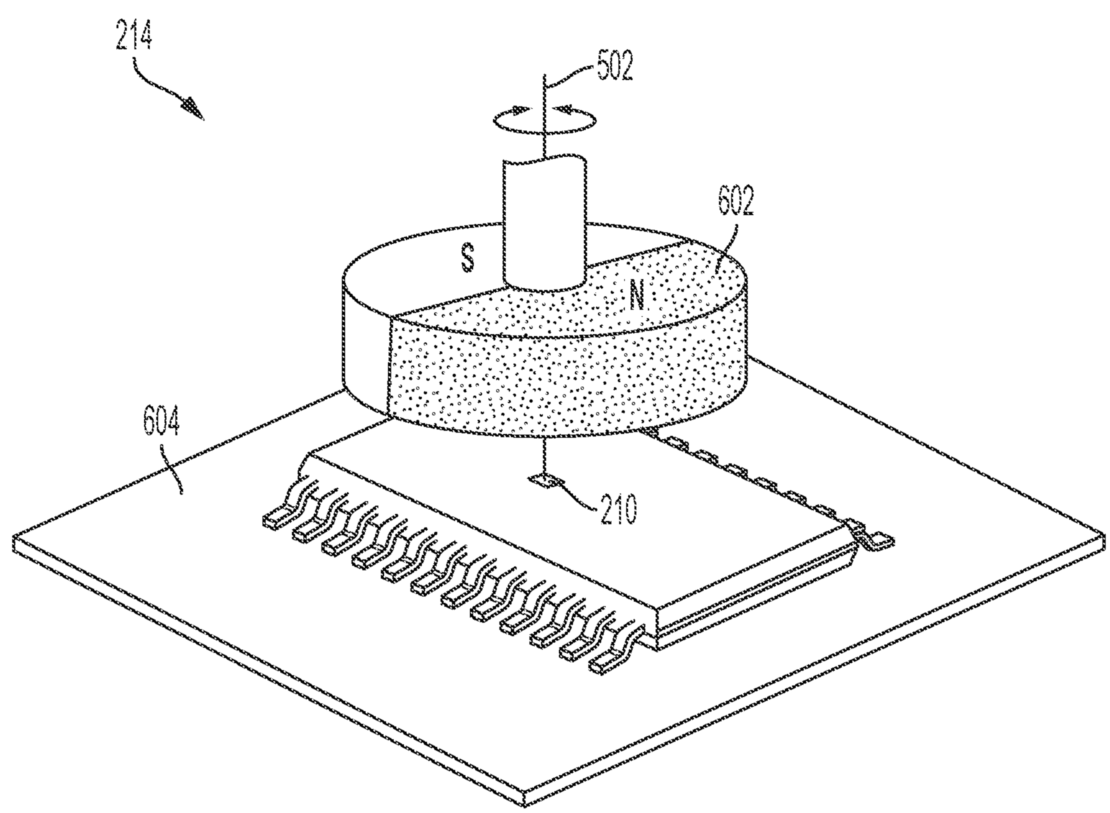
FIG. 6 provides a perspective view of a sensor device according to the principles of the present disclosure.

FIG. 6 provides an enlarged perspective view of the sensor device 214. As shown in FIG. 6, the sensor device 214 includes a circuit board 604 to which the Hall-effect sensor 210 is mounted. In some embodiments, the Hall-effect sensor 210 may be of the Multi-Segment Circular Vertical type. As further depicted in FIG. 6, the Hall-effect sensor 210 is positioned so that the magnetic axis of rotation 502 is aligned with a center of the Hall-effect sensor 210. This reduces errors in the sensed rotation. In some embodiments, the Hall-effect sensor 210 may allow for calibrations to compensate for centering errors, thus making it robust to manufacturing variance. Because the sensor device 214 is magnetic in design, the strength of the magnetic field has an effect on the accuracy. Magnetic field strength for this type of the Hall-effect sensor 210 is typically 200-500 gauss.

In some embodiments, optimal separation from the Hall-effect sensor 210 to a magnet 602 ranges from two to four millimeters in most cases. This can be changed using different magnet sizes and materials. Resolutions with less than one degree of error may be achievable with these parameters.

Further, in some embodiments, the Hall-effect sensor 210 is available in different configurations. For example, the Hall-effect sensor 210 may have one or two Hall Effect elements. The two Hall Effect elements may provide redundancy for applications requiring additional robustness or functional safety considerations.

In some embodiments, the Hall-effect sensor 210 shall measure angles less than three hundred and sixty (360) degrees to assure that each angular displacement of magnet 602 is uniquely correlated to one rake position of the rake bracket 220 (shown in FIGS. 2-5). To increase the accuracy of the measurement, the mechanical ratio of the sector 204 to the gear 402 may be selected to provide slightly less than one three hundred and sixty (360) degrees of rotation of the magnet 602.

Figure 7:
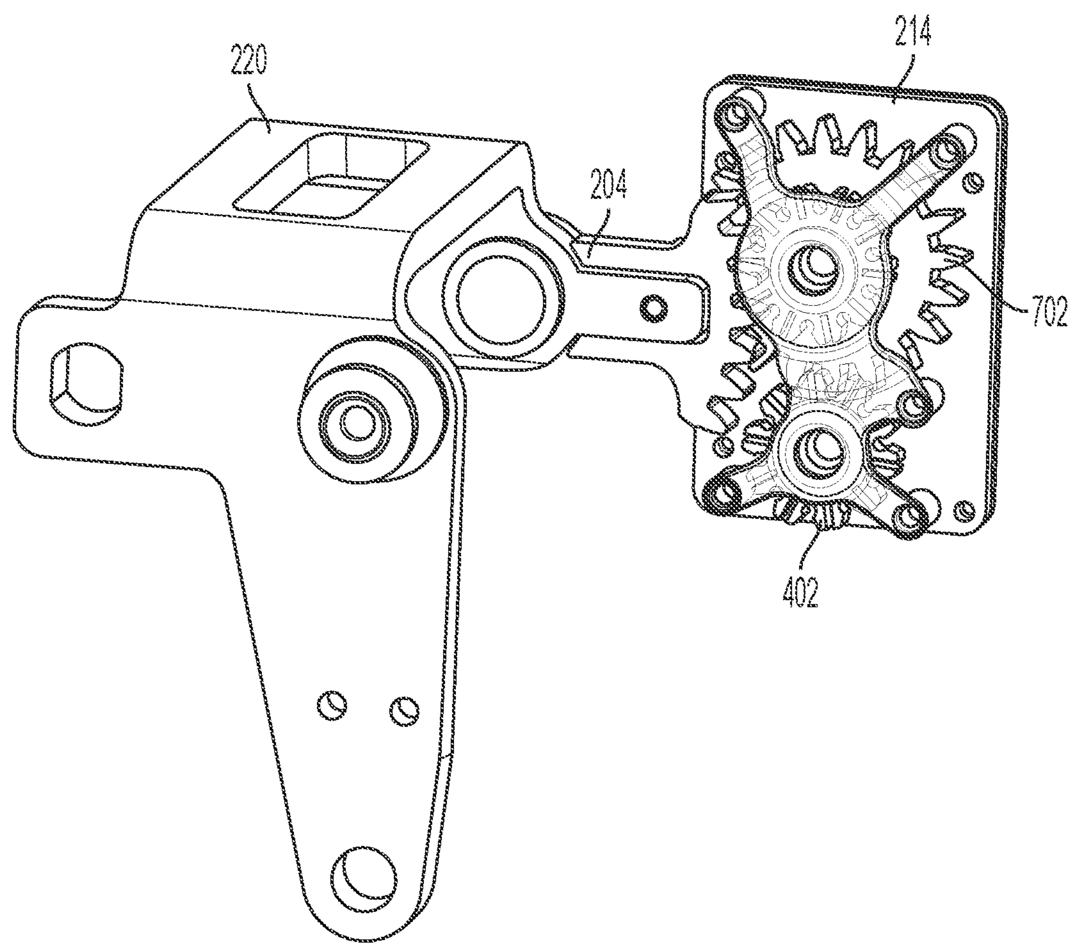
FIG. 7 generally illustrates an enlarged perspective view of a steering column assembly according to the principles of the present disclosure.

In some embodiments, whereby the sector-to-gear ratio does not provide adequate resolution, a second gear may be included. To explore this further, FIG. 7 will now be described. For example, as shown in FIG. 7, the sector 204 may drive an intermediate gear 702 (or top idler gear) and the intermediate gear 702 may drive the gear 402 containing the magnet 602. The two pitch diameters on the intermediate gear may work to amplify the rotatory motion of the magnet 602. In particular, this arrangement allows the number of turns on the magnet to approach one turn—thereby, maximizing the resolution of the one-turn Hall-effect sensor (e.g., the Hall-effect sensor 210) mounted to the sensor device 214.

In some embodiments, the sector 204 may be replaced with a rack adjustment mechanism of the steering column assembly. This embodiment would require that during pivoting of the rack adjustment mechanism that there be consistent engagement with the gear 402.

Some advantages of the embodiments described herein include the following: non-contact sensor implementation prevents wear and friction from relative motion of target and Hall-effect sensor IC; absolute position sensing of rake position prevents errors associated with relative position systems; and Hall-effect sensor IC is programmable for range, offset, temperature compensation to provide robust signal. Moreover, as described above, relative motion between the target and the sensor can be accomplished with a moving target and stationary sensor. Relative motion between the target and sensor may also be accomplished with a stationary target and a moving sensor.

In some embodiments, an absolute position sensor system is integrated into a steering column assembly of a vehicle. The absolute position sensor system comprises: a sector connected to a rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device configured to: detect an angle of rotation of the magnet, the angle of rotation of the magnet corresponding to a position of the rake adjustment mechanism; and generate, for a controller configured to monitor positioning of a steering column of the steering column assembly, a signal that indicates the position of the steering column.

In some embodiments, the absolute position sensor system further comprises: an intermediate gear coupled to the sector and coupled to the gear. The intermediate gear is operable to be rotated by the movement of the sector and the gear is operable to be rotated by the rotation of the intermediate gear.

In some embodiments, the sector is coupled to the gear through teeth of the gear.

In some embodiments, the sensor device includes a Hall-effect integrated circuit.

In some embodiments, the sensor device includes dual Hall-effect elements.

In some embodiments, the Hall-effect integrated circuit is positioned such that an axis of rotation of the magnet is aligned with a center of the Hall-effect integrated circuit.

In some embodiments, the rake adjustment mechanism of the steering column assembly is operable to move in an arcuate motion for rake adjustment of the steering column.

In some embodiments, the stationary part of the steering column assembly is operable to mount the steering column assembly to the vehicle.

In some embodiments, a steering column assembly of a vehicle, comprises: a steering column; a mounting bracket operable to attach the steering column assembly to the vehicle; a rake adjustment mechanism operable to move in an arcuate motion to adjust the steering column in a rake direction; and an absolute position sensor system. The absolute position sensor system comprises: a sector connected to the rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly. The sensor device configured to: detect an angle of rotation of the magnet, the angle of rotation of the magnet corresponding to a position of the rake adjustment mechanism; and generate a signal that indicates the position of the steering column.

In some embodiments, the steering column assembly further comprises a controller configured to: receive the signal that indicates the position of the steering column;

generate a steering column position control value based on the signal; and selectively control the position of a steering wheel of the vehicle based on the steering column position control value.

In some embodiments, the sensor device includes a Hall-effect integrated circuit.

In some embodiments, the sensor device includes dual Hall-effect elements.

In some embodiments, the Hall-effect integrated circuit is positioned such that an axis of rotation of the magnet is aligned with a center of the Hall-effect integrated circuit.

In some embodiments, the absolute position sensor system further comprises: an intermediate gear coupled to the sector and coupled to the gear, the intermediate gear operable to be rotated by the movement of the sector and the gear operable to be rotated by the rotation of the intermediate gear.

In some embodiments, the sector is coupled to the gear through teeth of the gear.

In some embodiments, a steering column assembly of a vehicle, comprises: a steering column; a mounting bracket operable to attach the steering column assembly to the vehicle; a rake adjustment mechanism operable to move in an arcuate motion to adjust the steering column in a rake direction; an absolute position sensor system comprising: a sector connected to the rake adjustment mechanism of the steering column assembly and operable to be moved thereby; a gear coupled to the sector and operable to be rotated by the movement thereof; a magnet connected to and retained by the gear such that the magnet rotates responsive to the rotation of the gear; and a sensor device positioned below the magnet and connected to a stationary part of the steering column assembly, the sensor device configured to: detect an angle of rotation of the magnet, the angle of rotation of the magnet corresponding to a position of the rake adjustment mechanism; and generate a signal that indicates the position of the steering column; a controller configured to: receive the signal that indicates the position of the steering column; generate a steering column position control value based on the signal; and selectively control the position of a steering wheel of the vehicle based on the steering column position control value.

In some embodiments, the sensor device includes a Hall-effect integrated circuit.

In some embodiments, the sensor device includes dual Hall-effect elements.

In some embodiments, the Hall-effect integrated circuit is positioned such that an axis of rotation of the magnet is aligned with a center of the Hall-effect integrated circuit.

In some embodiments, the absolute position sensor system further comprises: an intermediate gear coupled to the sector and coupled to the gear, the intermediate gear operable to be rotated by the movement of the sector and the gear operable to be rotated by the rotation of the intermediate gear.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term system can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a system can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a system can include memory that stores instructions executable by a controller to implement a feature of the system.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. An absolute position sensor system integrated into a steering column assembly of a vehicle, comprising:
- a sector connected to a rake adjustment mechanism of the steering column assembly and operable to be moved thereby;
- a gear coupled to the sector and operable to be rotated by the movement thereof;
- a magnet connected to and retained by the gear such that the magnet rotates responsive to the rotation of the gear; and
- a sector device positioned below the magnet and connected to a stationary part of the steering column assembly, the sensor device configured to:
  - detect an angle of rotation of the magnet, the angle of rotation of the magnet corresponding to a position of the rake adjustment mechanism; and
  - generate, for a controller configured to monitor positioning of a steering column of the steering column assembly, a signal that indicates the position of the steering column.

2. The absolute position sensor system of claim 1, further comprising:
- an intermediate gear coupled to the sector and coupled to the gear, the intermediate gear operable to be rotated by the movement of the sector and the gear operable to be rotated by the rotation of the intermediate gear.

3. The absolute position sensor system of claim 1, wherein the sector is coupled to the gear through teeth of the gear.

4. The absolute position sensor system of claim 1, wherein the sensor device includes a Hall-effect integrated circuit.

5. The absolute position sensor system of claim 3, wherein the sensor device includes dual Hall-effect elements.

6. The absolute position sensor system of claim 3, wherein the Hall-effect integrated circuit is positioned such that an axis of rotation of the magnet is aligned with a center of the Hall-effect integrated circuit.

7. The absolute position sensor system of claim 1, wherein the rake adjustment mechanism of the steering column assembly is operable to move in an arcuate motion for rake adjustment of the steering column.

8. The absolute position sensor system of claim 1, wherein the stationary part of the steering column assembly is operable to mount the steering column assembly to the vehicle.

9. A steering column assembly of a vehicle, comprising:
- a steering column;
- a mounting bracket operable to attach the steering column assembly to the vehicle;
- a rake adjustment mechanism operable to move in an arcuate motion to adjust the steering column in a rake direction; and
- an absolute position sensor system comprising:
- a sector connected to the rake adjustment mechanism of the steering column assembly and operable to be moved thereby;
- a gear coupled to the sector and operable to be rotated by the movement thereof;
- a magnet connected to and retained by the gear such that the magnet rotates responsive to the rotation of the gear; and
- a sensor device positioned below the magnet and connected to a stationary part of the steering column assembly, the sensor device configured to:
  - detect an angle of rotation of the magnet, the angle of rotation of the magnet corresponding to a position of the rake adjustment mechanism; and
  - generate a signal that indicates the position of the steering column.

10. The steering column assembly of claim 9, further comprising a controller configured to:
- receive the signal that indicates the position of the steering column;
- generate a steering column position control value based on the signal; and
- selectively control the position of a steering wheel of the vehicle based on the steering column position control value.

11. The steering column assembly of claim 9, wherein the sensor device includes a Hall-effect integrated circuit.

12. The steering column assembly of claim 11, wherein the sensor device includes dual Hall-effect elements.

13. The absolute position sensor system of claim 11, wherein the Hall-effect integrated circuit is positioned such that an axis of rotation of the magnet is aligned with a center of the Hall-effect integrated circuit.

14. The steering column assembly of claim 9, wherein the absolute position sensor system further comprises:
- an intermediate gear coupled to the sector and coupled to the gear, the intermediate gear operable to be rotated by the movement of the sector and the gear operable to be rotated by the rotation of the intermediate gear.

15. The steering column assembly of claim 9, wherein the sector is coupled to the gear through teeth of the gear.

16. A steering column assembly of a vehicle, comprising:
- a steering column;
- a mounting bracket operable to attach the steering column assembly to the vehicle;
- a rake adjustment mechanism operable to move in an arcuate motion to adjust the steering column in a rake direction;
- an absolute position sensor system comprising:
- a sector connected to the rake adjustment mechanism of the steering column assembly and operable to be moved thereby;
- a gear coupled to the sector and operable to be rotated by the movement thereof;
- a magnet connected to and retained by the gear such that the magnet rotates responsive to the rotation of the gear; and
- a sensor device positioned below the magnet and connected to a stationary part of the steering column assembly, the sensor device configured to:
  - detect an angle of rotation of the magnet, the angle of rotation of the magnet corresponding to a position of the rake adjustment mechanism; and
  - generate a signal that indicates the position of the steering column;
  - a controller configured to:
    - receive the signal that indicates the position of the steering column;
    - generate a steering column position control value based on the signal; and
    - selectively control the position of a steering wheel of the vehicle based on the steering column position control value.

17. The steering column assembly of claim 16, wherein the sensor device includes a Hall-effect integrated circuit.

18. The steering column assembly of claim 17, wherein the sensor device includes dual Hall-effect elements.

19. The steering column assembly of claim 17 wherein the Hall-effect integrated circuit is positioned such that an axis of rotation of the magnet is aligned with a center of the Hall-effect integrated circuit.

20. The steering column assembly of claim 16, wherein the absolute position sensor system further comprises:

an intermediate gear coupled to the sector and coupled to the gear, the intermediate gear operable to be rotated by the movement of the sector and the gear operable to be rotated by the rotation of the intermediate gear.

* * * * *